United States Patent Office 3,379,756
Patented Apr. 23, 1968

3,379,756
MANUFACTURE OF MALIC ACID
Carl R. Ahlgren, East Aurora, N.Y., assignor to Allied Chemical Corporation, New York, N.Y., a corporation of New York
No Drawing. Filed Oct. 15, 1964, Ser. No. 404,166
9 Claims. (Cl. 260—535)

ABSTRACT OF THE DISCLOSURE

Synthesis of malic acid from maleic and/or fumaric acid in a reaction zone whose surfaces exposed to the reaction mixture consist of titanium, zirconium or tantalum and alloys containing at least 90% of one of these metals.

---

The synthesis of malic acid from maleic acid which involves the isomerization of maleic acid to fumaric acid and the hydration of the fumaric acid to malic acid is well known. The hydration step is normally carried out at elevated temperature and under superatmospheric pressure. The mixture of maleic, fumaric and malic acids formed under such conditions is highly corrosive to the usual materials used to fabricate chemical equipment including chrome-nickel acid resistant steels, enamel clad steel, aluminum bronze and the like, and thus complicates the isolation and purification of the product, d,l-malic acid which is useful principally as an edible substitute for the natural d-malic acid.

It has been suggested to perform this conversion of maleic acid to malic acid in an autoclave lined with a layer of lead and to add a small amount of sulfuric acid to the reaction mixture. The sulfuric acid not only accelerates the isomerization of the maleic acid to fumaric and thus shortens the reaction time but also forms a coating of lead sulfite and/or lead sulfate on the exposed surfaces of the autoclave thus reducing the corrosive attack of the reaction mixture. However, the use of lead-lined equipment in conjunction with sulfuric acid containing reaction mixtures introduces heavy metal ions into a product which is intended for use mainly as a component in compositions intended for human consumption. The removal of such heavy metal ions, especially in a large commercial operation, is both time consuming and expensive. Such problems have accordingly militated against the chemical synthesis of malic acid on a commercial scale.

It is therefore a principal object of this invention to provide an improved process for the manufacture of malic acid wherein corrosion of the surfaces of the reaction zone is negligible.

Another object is to provide a reaction vessel used in preparing malic acid from maleic and fumaric acid which vessel is resistant to significant corrosive attack during the reaction. Other objects and advantages ancillary thereto will be apparent from the following description of my invention and appended claims.

I have now found that malic acid can be synthesized from an acid selected from the group consisting of maleic acid, fumaric acid and mixtures thereof in an aqueous reaction mixture in excellent yields and with particularly high purity by performing the synthesis in a zone whose surfaces exposed to the reaction mixture consist of at least one material selected from the groups of titanium, zirconium and tantalum metal and alloys containing at least 90% of said metal. The synthesis of malic acid from a maleic/fumaric acid reaction mixture can be performed by heating an aqueous solution of a maleic/fumaric reaction mixture at an elevated temperature, say 160 to 250° C., preferably between 180 and 220° C., and under superatmospheric pressure, say at least 150 p.s.i.g., preferably 200 to 260 p.s.i.g., for a period of at least two hours, preferably 3 to 5 hours. In carrying out the reaction in a zone of the type above specified, there is provided a yield of malic acid substantially free from contaminants due to the reactor heretofore experienced. Negligible corrosion of the reactor is observed.

Of the aforesaid group of metals, titanium is preferred for the reason that not only is it resistant to corrosive attack in the presence of the reaction mixture but also is the most economical for use at current prices. The resistance of titanium to corrosion in this synthesis is highly surprising inasmuch as the reaction conditions present during the conversion of maleic and fumaric acid to malic acid are considered to be reducing in character and titanium has been found to undergo attack in reducing atmospheres and in the presence of non-oxidizing acids such as formic and acetic acids (Chem. & Ind., 1958, 68, Ind. Eng. Chem. 55, 53–7 (1963)). However, titanium, tantalum and zirconium, I have ound provide excellent resistance to corrosion under conditions existing in the chemical synthesis of malic acid from maleic acid and the reaction product so obtained has a negligible amount of corrosion product therein making the porcess suitable for use of malic acid for human consumption.

The conversion of maleic acid to malic acid in a zone above specified in accordance with the present invention can be effected either batchwise or continuously. When carried out as a batch process, an aqueous solution of maleic acid, preferably containing fumaric acid is heated in a closed reactor, the exposed surfaces of which are of titanium, zirconium or tantalum metal or an alloy containing at least 90% of such metal, at a temperature above 160° C. and preferably at about 180° to 220° C., under a pressure of at least 150 p.s.i.g., preferably from about 200 to 260 p.s.i.g., for a period of at least 2 hours and preferably from 3 to 5 hours. The reaction occurs in a single phase, all the components and product being present in solution at the temperature used, and hence it is not necessary to agitate the reaction mixture. Thereafter the reaction mixture is cooled to a suitable lower temperature to crystallize and separate most of the fumaric acid from the more soluble maleic and malic acids. The fumaric acid crystals are separated in any convenient manner, as by filtration or centrifugation, and the malic acid containing filtrate is concentrated to effect the separation of malic acid from the maleic acid by fractional crystallization. The mother liquor from the fumaric acid separation can be treated in a known manner to remove undesirable heavy metal ions, if present, as by ion exchange resins, prior to the separation of the malic acid. The filtrate after separation of malic acid can be recycled to the reactor after addition of maleic acid and/or fumaric acid. The reactor is substantially unaffected and as one result the reaction mixture is not contaminated with heavy metal ions such as are picked up when the reaction is run in apparatus fabricated from steel, lead, or aluminum bronze.

The reactor and other items of apparatus which are exposed to the hot maleic acid reaction mixture can be fabricated of solid titanium, zirconium or tantalum or the reactor can be made of a different metal, e.g. steel, and lined on the inside with the corrosion resistant metal in a manner well known to those skilled in this art. In view of the negligible attack, the metals, when used as liners, can be of minimum thickness, thereby reducing the cost of fabrication and installation.

The following example will illustrate the process of my invention. Parts are by weight and temperatures are given in degrees centigrade.

Example 1

A reactor having a capacity of about 1,500 parts of water was fabricated from a length of titanium metal pipe (99.2% Ti). A titanium metal flange was welded to the body of the reactor which was equipped with a titanium metal cover fitted with a pressure gauge, thermometer well and pressure release valve. An electric heating mantle was positioned on the outside of the reactor body and heating was regulated by means of a conventional rheostat. A mixture of 300 parts of maleic acid, 250 parts of fumaric and 450 parts of water were charged to the titanium reactor. The reactor was closed and the contents heated in 30 minutes to 200°. The pressure within the reactor was 153 to 157 p.s.i.g. The batch was maintained at 200° for 3 hours and then rapidly cooled to below 100° by immersing the reactor in cold water. The pressure within the reactor dropped to 0 p.s.i.g. The cover of the reactor was removed and the contents were agitated while being cooled to about 25°. The crystals of fumaric acid were filtered from the mother liquor and washed with cold water. The washed crystals were dried and amounted to 266 parts by weight. The mother liquor was analyzed for total acidity by titration with standard base and for unsaturated acids by polarographic determination.

From these data it was ascertained that the mother liquor contained 3 parts of fumaric acid 14 parts of maleic acid and 295 parts of malic acid. This amount of malic acid represents a yield of 95.6% on the unsaturated acids consumed. Careful examination of the reactor gave no evidence of corrosive attack.

Example 2

The procedure of Example 1 was repeated with the inclusion of test pieces of various metals and alloys immersed in the reaction mixture, and extension of the reaction period from 3 to 48 hours. Following completion of this period the rate of corrosion of the test pieces was determined as described in Perry's Chemical Engineer's Handbook, fourth edition (1963) McGraw-Hill, pp. 23–71. These tests indicated the following:

|  | in. penetration/year |
|---|---|
| Aluminum-bronze | 0.017 |
| Titanium metal | 0.0026 |
| Zirconium metal | 0.002 |
| Tantalum metal | 0.0002 |

These data indicate that titanium, zirconium and tantalum are all about equal in resistance to corrosive attack by maleic-fumaric-malic acid mixtures and are in the range of ten times more resistant than aluminum-bronze which has been found to be unsuitable as a material of construction for equipment to be used in this synthesis.

It can thus be seen that an effective and highly practical process for the improved preparation of malic acid from maleic acid has been devised.

The terms and expressions which have been employed are used as terms of description and not of limitation, and there is no intention, in the use of such terms and expressions, of excluding any equivalents of the features shown and described or portions thereof, but it is recognized that various modifications are possible within the scope of the invention claimed.

I claim:
1. In a process for the synthesis of malic acid from an acid selected from the group consisting of maleic acid, fumaric acid and mixtures thereof in an aqueous reaction mixture at elevated temperature and pressure, the improvement of performing the synthesis in a zone whose surfaces exposed to the reaction mixture consist of at least one material from the group of titanium, zirconium, and tantalum and alloys containing at least 90% of said metal.

2. A process according to claim 1 wherein said material is titanium.

3. A process according to claim 1 wherein said material is zirconium.

4. A process according to claim 1 wherein said material is tantalum.

5. A process according to claim 1 wherein said acid is maleic acid.

6. A process according to claim 1 wherein said acid is fumaric acid.

7. A process according to claim 1 wherein said acid is a mixture of maleic and fumaric acids.

8. A process for the synthesis of malic acid from maleic/fumaric acid reaction mixture which comprises heating an aqueous maleic/fumaric acid solution at between 160 and 250° C. at a pressure of at least 150 p.s.i.g. for at least two hours, said synthesis being conducted in a zone whose surfaces exposed to the reaction mixture consist of at least one material from the group of titanium, zirconium and tantalum and alloys containing at least 90% of said metal.

9. A process according to claim 5 wherein said synthesis is performed at temperatures between 180 and 220° C., at a pressure between 200 and 260 p.s.i.g. for between 3 and 5 hours.

References Cited

FOREIGN PATENTS 476,109 11/1937 Great Britain.
832,995 4/1960 Great Britain.

LORRAINE A. WEIMBERGER, Primary Examiner.

A. P. HALLUIN, Assistant Examiner.